Patented Dec. 15, 1936

2,064,667

UNITED STATES PATENT OFFICE 2,064,667

PROCESS OF REACTING OLEFINES WITH SULPHURIC ACID

Kenneth B. Lacy, Highland Park, Ill., assignor to Van Schaack Bros. Chemical Works, Inc., Chicago, Ill., a corporation of Illinois No Drawing. Application April 8, 1931, Serial No. 528,709

6 Claims. (Cl. 260—99.12)

This invention relates to a process of reacting an olefine with sulphuric acid. An object is to minimize, in the reaction product, the proportion of alkyl sulphates corresponding to tertiary alcohols and to increase the proportion of such alkyl compounds corresponding to secondary alcohols. Another object is to produce a reaction product whose alkyl or alcohol content decreases only slightly on ageing. Other objects will appear from the detailed description which follows.

When olefine gases containing straight-chain olefines, as, for example, 1- or 2-butene, and also branch-chain olefines, of which isobutene is an example, are absorbed in diluted sulphuric acid, there is produced an acid liquor containing alkyl sulphates corresponding to secondary and tertiary alcohols. In fact, such alcohols are produced by diluting the acid liquid with several times its volume of water and then distilling.

For certain commercial purposes, as in the making of esters, secondary alcohols are preferred to tertiary.

The method by which I increase the percentage of secondary alkyl derivatives and decrease the percentage of tertiary in the acid liquor resulting from the absorption of olefines in sulphuric acid is illustrated by the following example: A gaseous mixture of olefines comprising propylene, a normal butene, and isobutene is brought into intimate contact with 75 per cent sulphuric acid at a temperature above the freezing point of the acid, suitably between 10° and 60° C. I have used 30 to 40° C. satisfactorily.

Sufficient olefine mixture is introduced into the sulphuric acid to saturate the acid to such an extent that further absorption of olefines becomes slow. This is the degree of saturation obtained when the acid liquor, on dilution with four times its weight of water and fractionation, gives alcohols corresponding to approximately 40 to 44 per cent of the weight of the acid liquor. When the stated degree of saturation is reached, the introduction of olefine is discontinued and the acid liquor is allowed to age. During this ageing, the tertiary alcohol and/or other tertiary alkyl compounds present gradually change to hydrocarbon polymers, which rise as an upper layer on the heavier acid liquor and may be separated by gravity.

The period of ageing required to polymerize most of the tertiary compounds varies with the temperature at which the ageing is conducted. Thus 2 to 24 hours, say 8 hours, are used at 50° C. to 60° C., as, for example 55° C., whereas longer times are required at lower temperatures. Thus several days are desirable at 40° C. or lower temperatures. At temperatures above 60° C., on the other hand, very short periods of ageing are sufficient. Temperatures below room temperature are usually not employed.

The aged acid liquor, after being separated from the oily layer resulting from the polymerization of a large part of the tertiary compounds and a lesser part of the secondary compounds, is now again brought into intimate contact with a fresh supply of the olefine mixture, at a temperature between 10° and 60° C., suitably 40° C. This contact is continued until the alkyl content of the acid liquor, as determined by diluting a sample with water and fractionating, again corresponds to 40 to 44 per cent of alcohols, suitably 42 to 43 per cent, on the weight of the acid liquor.

As a variation from the details of the above illustration, the olefine mixture used for saturation of the aged acid liquor may be first treated with 75 per cent sulphuric acid that is substantially unsaturated with respect to isobutene, to remove a large proportion of the isobutene from the olefine mixture before contacting it with the aged acid liquor. In this way the aged acid liquor, after the final saturation, will contain a relatively very high percentage of secondary alkyl compounds or alcohols and very little tertiary.

Many variations may be made from the details of the above example without departing from the spirit of my invention.

Thus, the gaseous mixture of olefines may be brought into contact with the sulphuric acid, at atmospheric or a different pressure, as, for example, super-atmospheric, say 60 lbs. per square inch. Or, the mixture may contain higher boiling olefines than butylene, as, for example, amylenes, hexylenes, etc., and may be used in the gaseous or liquid state. A suitable olefine mixture is that obtained by the cracking of petroleum, suitably in the vapor-phase, and fractionating to produce an olefine mixture of boiling range desired, as, for example, mixtures distilling between −60° and +70° C., −60° and +30° C., 17° and 100° C., and/or −10° and +10° C.

Means of contacting the olefine mixture with the sulphuric acid or acid liquor may be varied. Thus, the gas may be allowed to bubble through the acid. Or, liquid olefines may be agitated with the acid in a tank or autoclave.

The percentage of sulphuric acid used in the example above is 75, the remainder being water. I may vary this ratio. Thus I may use 55 to 92 per cent sulphuric acid, suitably 65 to 87 per cent. I have used satisfactorily 75 to 87 per cent acid.

The ageing of the acid liquor, to polymerize tertiary alkyl compounds, may be done without interrupting the contact with the olefines being absorbed. Thus olefine gas may be bubbled through a nearly or partly saturated acid liquor at such a temperature above 30° C., suitably at 40° to 60° C., say 50° C., that the polymerization of the tertiary alkyl compounds occurs while the absorption of additional amounts of olefine or olefines is in progress. In such a case, the resulting polymers may be separated from the acid liquor, during the progress of the absorption, by temporarily interrupting the agitation and separating the upper layer of polymers, by gravity; or, the polymers may be separated after the completion of the final saturation of the acid liquor.

The so-called acid liquor produced by my invention is useful in the production of secondary alcohols, by diluting with water, suitably about four volumes of water to one of acid liquor, and distilling or fractionating.

I claim:

1. The process which comprises reacting a cracked petroleum product with 65 to 87 per cent sulphuric acid at a temperature of about 50° C., ageing the resulting acid liquor at a temperature not below atmospheric and not substantially above 60° C., and then reacting the aged liquor with an additional quantity of the cracked petroleum product.

2. The process which comprises reacting a cracked petroleum product with 65 to 87 per cent sulphuric acid at a temperature above the freezing point of the acid, ageing the resulting acid liquor at a temperature of 40° to 60° C., and then reacting the aged liquor with an additional quantity of the cracked petroleum product.

3. The process which comprises reacting a cracked petroleum product with 65 to 87 per cent sulphuric acid at a temperature above the freezing point of the acid, ageing the resulting acid liquor at a temperature of about 50° C. for approximately 4 hours, and then reacting the aged liquor with an additional quantity of the cracked petroleum product.

4. The process which comprises reacting an excess of vapor-phase cracked petroleum product, most of which distills in the temperature range $-10°$ to $+10°$ C., with 75 to 87 per cent sulphuric acid at a temperature of 30 to 40° C. until the rate of absorption of the petroleum product in the sulphuric acid becomes slow, ageing the resulting acid liquor at approximately 50° C. to 60° C. for several hours, and then substantially saturating the aged liquor with an additional quantity of the cracked petroleum product from which has been removed, by a preliminary treatment with sulphuric acid of concentration not above 87 per cent, substantial amounts of olefine in the form of tertiary alkyl compound.

5. The process which comprises reacting a cracked petroleum product with 65 to 92% sulphuric acid at a temperature above the freezing point of the acid, ageing the resulting acid liquor at a temperature of 40° to 60° C., and then reacting the aged acid liquor with an additional quantity of the cracked petroleum product.

6. The process which comprises reacting a cracked petroleum product with sulphuric acid at a temperature above the freezing point of the acid, ageing the resulting acid liquor at a temperature of 40° to 60° C., and then reacting the aged acid liquor with an additional quantity of the cracked petroleum product.

KENNETH B. LACY.